United States Patent
Raghunath (10) Patent No.: US 6,412,092 B1
(45) Date of Patent: Jun. 25, 2002

(54) METHOD AND APPARATUS TO REDUCE THE COST OF PREPARING THE CHECKSUM FOR OUT BOUND DATA IN NETWORK COMMUNICATION PROTOCOLS BY CACHING

(75) Inventor: Balakrishna Raghunath, San Jose, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/292,035

(22) Filed: Apr. 14, 1999

(51) Int. Cl.[7] .................................................. G06F 11/10
(52) U.S. Cl. ........................................ 714/807; 714/819
(58) Field of Search ................................... 714/758, 781, 714/807; 709/239; 713/193, 168; 370/392; 704/807, 819, 800, 801, 803, 804

(56) References Cited

U.S. PATENT DOCUMENTS

| 5,428,629 A | * | 6/1995 | Gutman et al. ............. 714/758 |
| 5,815,516 A | | 9/1998 | Aaker et al. ................. 371/53 |
| 5,826,032 A | | 10/1998 | Finn et al. ............. 395/200.66 |
| 5,832,235 A | | 11/1998 | Wilkes ................... 395/200.77 |
| 5,870,563 A | * | 2/1999 | Roper et al. ................ 709/239 |
| 6,038,694 A | * | 3/2000 | Swallow ...................... 714/781 |
| 6,092,193 A | * | 7/2000 | Loomis et al. ............. 713/193 |
| 6,185,207 B1 | * | 2/2001 | LaBerge et al. ............ 370/392 |
| 6,212,636 B1 | * | 4/2001 | Boyle et al. ................ 713/168 |

OTHER PUBLICATIONS

"Web Servers for a Mission Critical World" <http://www.zeus.co.uk/>.
"Network Engineer's Toolkit—TCP/IP Protocol Format", pp. 1 to 3 (visited Feb. 8, 1999) <http://www.wanresources.com/tcpcell.html>.
"Computing the Internet Checksum, Request For Comments 1071", R. Braden et al.; pp. 1 to 22 (visited Feb. 9, 1999) <htt://cnswww.cns.cwru.edu/net/odds–ends/rfc/rfc1071>.
"What Is . . . TCP (Transmission Control Protocol)" (visited Feb. 8, 1999) <http://www.whatis.com/tcp.htm>.
"Microsoft Windows Technologies—Internet Explorer"; pp. 1 to 3 (visited Apr. 7, 1999) <http://www.microsoft.com/windows/ie/Features/default.asp>.
"Network Engineer's Toolkit—Protocols", (visited Feb. 8, 1999) <http://www.wanresources.com/tcpip.html>.
"What Is . . .a checksum (a definition)" (visited Feb. 8, 1999) <http://www.whatis.com.checksum.htm>.
"RFC:793—Transmission Control Protocol, Darpa Internet Program, Protocol Specification, Sep. 1981", pp. 1 to 81 (visited) Feb. 8, 1999) <http://cnswww.cns.cwru.edu/net–odds–ends/rfc/rfc 793>.
B. Lehman et al., "Intellectual Property and the National Information Infrastructure", Sep. 1995, pp. 179–182 x.

* cited by examiner

Primary Examiner—David Ton (57) ABSTRACT

A method and apparatus that improves the efficiency of outbound data management for information transmitted over a communication network protocol by eliminating unnecessary operations related to the checksum when associated data has not changed since the last determination of the checksum. Overall computer system costs are reduced by eliminating checksum functionality on computer networking cards and thereby minimizing overall checksum functionality requirements in the computer system. The checksum that is derived on the first instance of data transmittal is cached. Thereafter, on subsequent transmissions of the data, the cached checksum may be re-used. Further, partial checksums can be calculated for portions of data that will be transmitted. The partial checksums may be combined to create a checksum that represents the aggregate of the data that will be transmitted.

24 Claims, 9 Drawing Sheets

PRIOR ART

METHOD AND APPARATUS TO REDUCE THE COST OF PREPARING THE CHECKSUM FOR OUT BOUND DATA IN NETWORK COMMUNICATION PROTOCOLS BY CACHING

FIELD OF THE INVENTION

The present invention relates generally to a method and apparatus for caching and re-using the checksum associated with outbound data transmitted via a network communication protocol.

BACKGROUND OF THE INVENTION

Computers may operate in a configuration such as a network, which allows communication between the computers such as transmittal and receipt of data. The Transmission Control Protocol/Internet Protocol (TCP/IP) is a common networking protocol used for communication among computers that allows uniform formatting of data for transmittal and receipt.

It will be appreciated that according to the, "Transmission Control Protocol DARPA Internet Program Protocol Specification 793," September, 1981, a TCP/IP packet is the unit of a transaction between a host computer and another computer connected through a network to the host computer. Computers may be sources and destinations of packets.

The TCP/IP protocol ensures proper transmission of data by including a checksum that allows operations of the receiving computer to verify that the data in the transmitted packet has not changed during transmission. More particularly, a sending computer may operate to determine a checksum that is based on the contents of a packet of data sent and to store this checksum with the packet of data. The receiving computer then may operate to compute the checksum associated with the packet and compare it with the stored checksum to verify that the packet has been received intact. Typically, a checksum is a number that represents the summation of representative values of all the text in a packet that both the sender and the receiver may determine. Therefore, by comparing the checksum stored by the sender to a checksum determined by the receiver, the receiver can verify the data in the transmitted packet.

A checksum may be determined by any means specified by the networking protocol. For example, the checksum specified by the TCP/IP Protocol may be determined by means described in, "Request for Comments of the Network Working Group 1071," on the website address:cnswww.cns.cwru.edu/net/odds-ends/rfc/rfc1071.

A bit is the smallest unit of measurement in a computer system and generally may either have the value of "on" or "off." A byte is a unit of data and is typically eight bits in size.

Networking capability is often managed by a networking device such as a computer-compatible networking card that is included in a computer system. Some networking cards have a checksum offload facility that operates to calculate and verify the checksum of each packet. However, this is disadvantageous in that the additional functionality of the networking card is usually supported at additional cost.

Further, many networking cards do not include the checksum functionality and therefore the checksum is determined by the computer system. Disadvantageously, a substantial portion of the computer resources and time required to send and receive TCP/IP packets may be spent in completing operations related to the checksum.

Computers may function as servers for internet or web-based operations. A server is a computer that provides services used by clients such as individual computers thereby facilitating access to internet or web-based information. A server may also provide services to other network attached computers, printers, or other devices. It will be appreciated that the terms "internet" and "web-based" will be used interchangeably herein and refer to a network architecture that allows different types of computers to uniformly communicate through a network that may include a series of intermediary computers. Thus, the internet enables the sharing of data in a common format among a variety of computers throughout the world.

It will be appreciated that when a computer functions as a web-based server the same data may be transmitted many times to various client computers. Typically the operating system (O.S.) of the server computer may store the most recently used data, such as file system data, in computer memory for potential re-use by other requesting client computers. A current disadvantage is that the checksum associated with the transmitted data must be re-calculated for each TCP/IP transmission, even when the data is unchanged.

SUMMARY OF THE INVENTION

The present embodiment is a checksum caching tool that improves the efficiency of the outbound data management for information transmitted over a communication network protocol by eliminating the unnecessary determination of the checksum when the associated data has not changed since the last determination of the checksum. The checksum caching tool operates in a computer system and may be an element of an O.S. Further, when the checksum is determined the checksum caching tool caches the checksum for possible re-use.

More particularly the checksum caching tool improves the efficiency of computing the checksum in a TCP packet for outbound data by re-using the cached checksum when data in the TCP packet that has not been altered. Therefore, the checksum caching tool reduces computer system utilization for computation of the checksum for outbound data.

It will be appreciated that the present embodiment operates on file system data in the file system buffer. However, the present invention is not limited to operation on file system data but may operate on other types of data in a computer system.

Accordingly it is an object of the invention to save computer resources by re-using the checksum for frequently accessed and transmitted data that is re-transmitted without alteration of the data.

Further, the present embodiment advantageously caches the checksum that is derived on the first instance of the transmittal of data. Thereafter, on subsequent transmissions of the data, the cached checksum may be re-used. The valid re-used checksum may be combined with other checksums that are calculated for portions of the checksum that must be computed anew and thereby creates a checksum that represents the aggregate of the data that will be transmitted.

It will be appreciated that the term "cache" as used herein is a label for a level of the memory in a computer system that is quickly accessible. Further, the term "cache" may also refer to the process of storing information in the memory for re-use. For instance information may be cached in a file system buffer, which may be referred to as "file system buffer cache" or "buffer cache."

The present embodiment also advantageously reduces the resources required to manage the creation of a checksum to a negligible level. Further, the present embodiment reduces overall computer system costs by eliminating checksum functionality on computer networking cards and thereby minimizing overall checksum functionality requirements in the computer system.

Other aspects and advantages of the present invention will become apparent from the following detailed description, taken in conjunction with the accompanying drawings, illustrating by way of example the principles of the invention.

DETAILED DESCRIPTION

In the following detailed description and in the several figures of the drawings, like elements are identified with like reference numerals.

Figure 1:
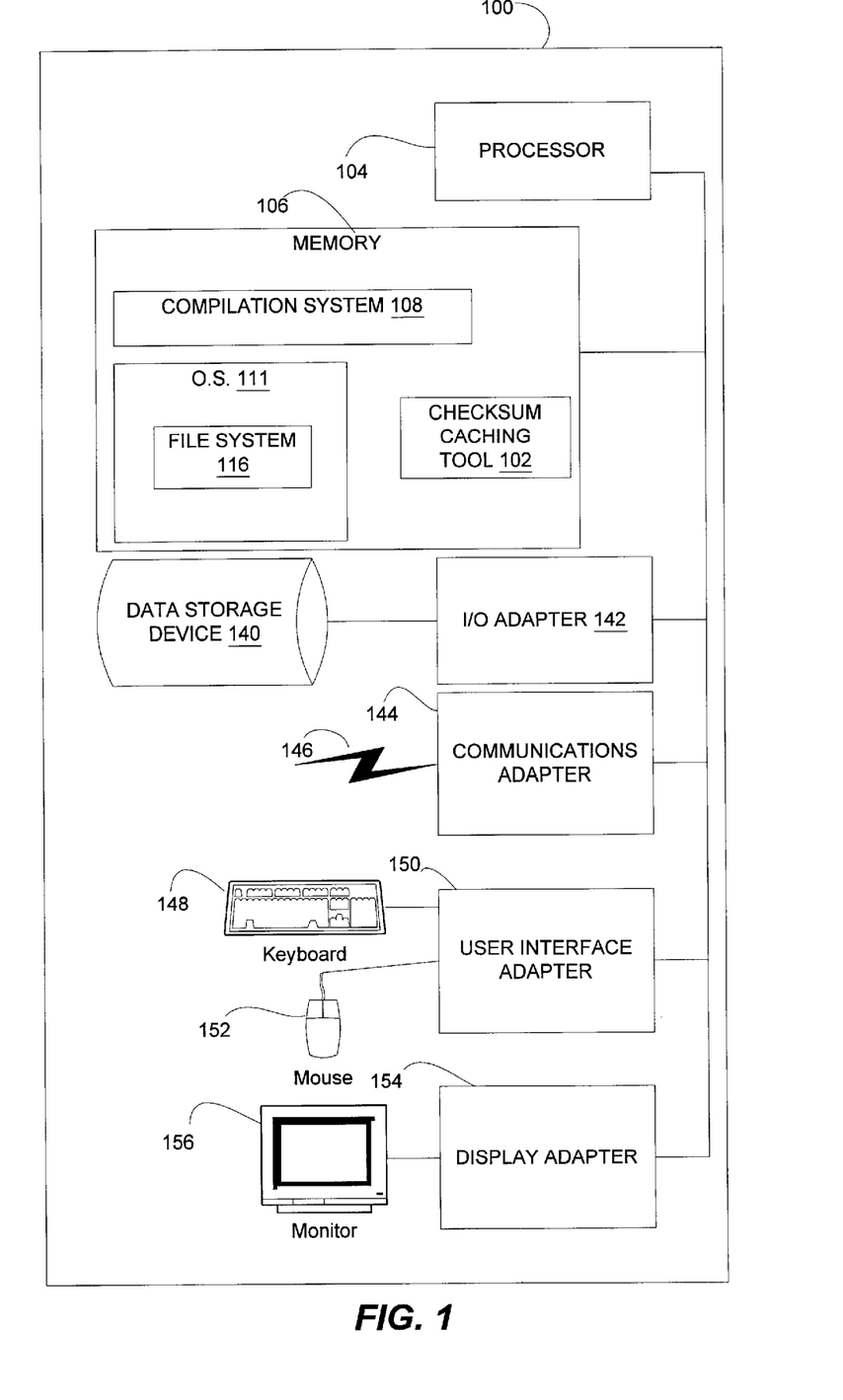
FIG. 1 is a block diagram that illustrates the computer system including the checksum caching tool.
Figure 2:
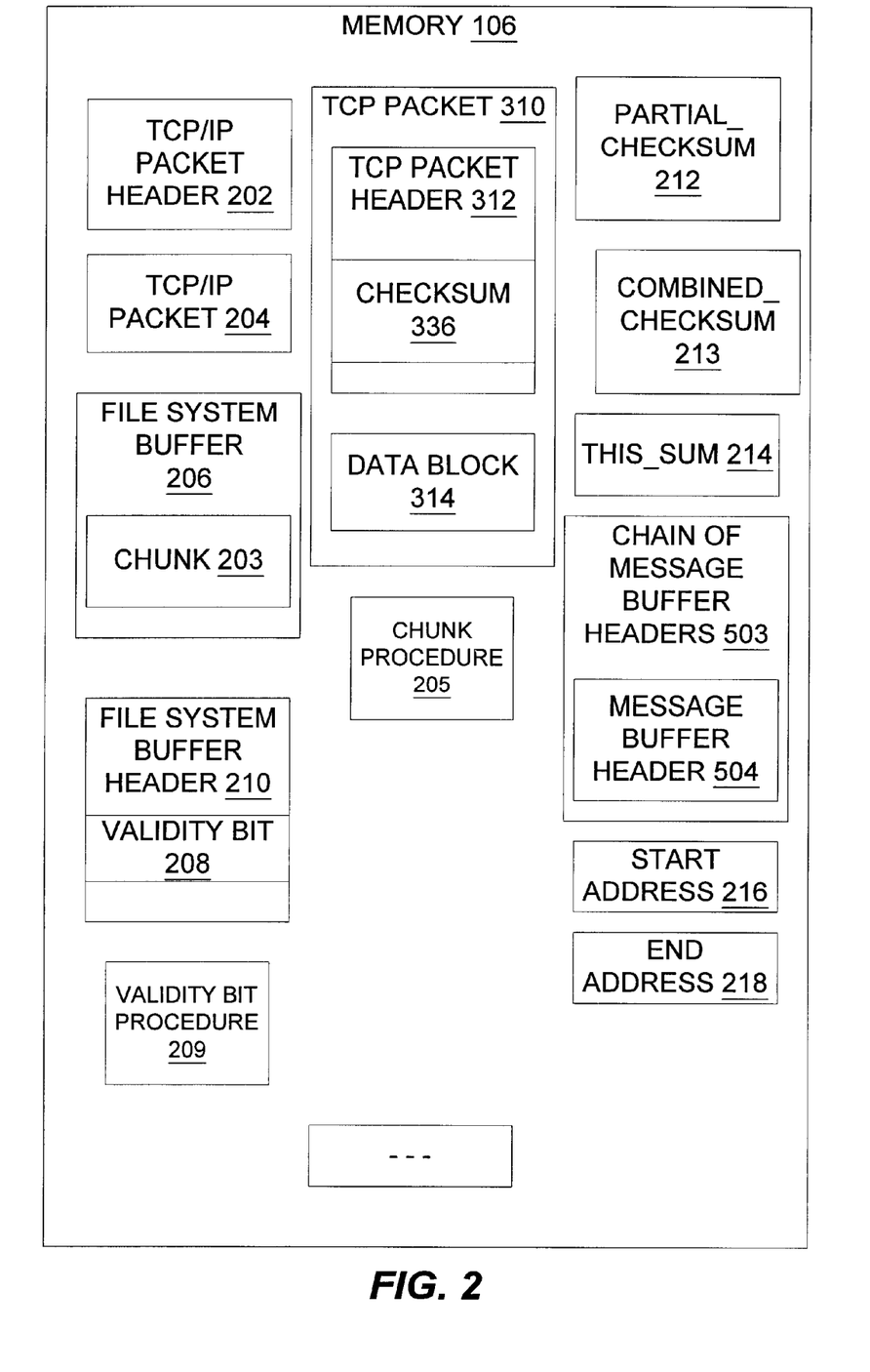
FIG. 2 is a block diagram of the memory that includes data structures used by the checksum caching tool.

Broadly stated, FIG. 1 illustrates a checksum caching tool 102 that may be an element of an O.S. 111 and operates in a computer system 100. The checksum caching tool 102 eliminates unnecessary operations to determine the checksum 336 (as shown in FIG. 2) associated with outbound data that is transmitted between computers when the associated data has not changed since the last determination of the checksum 336. Alternately, the checksum caching tool 102 selectively calculates portions of the checksum 336 when they are invalid and caches them in the memory 106 of the computer system 100 for possible re-use.

A network 146 may be associated with the computer system 100 that allows transmission of data between computers. Typically to ensure efficient operation, computer networks 146 operate within the specifications of a protocol that ensure transmission of data and operating instructions is performed according to a standard format. The checksum caching tool 102 may operate under any communications protocol that uses checksums 336 to validate that transmitted data has not been altered.

The checksum caching tool 102 includes instructions and data that may be referred to as values such as integer, real, or complex numbers; or characters. Alternately, the values may be pointers that reference values. Therefore, a pointer provides direction to locate a referenced value.

More particularly, the instructions may be operating instructions of the computer system 100, and may refer to addresses. The addresses may be physical addresses or virtual, symbolic addresses that represent physical computer addresses. For instance, a physical computer address may be a computer hardware register (not shown) or a location in the memory 106. The virtual address is mapped to the physical address.

FIG. 1 further represents the computer system 100 that includes components such as the processor 104, the memory 106, a data storage device 140, an I/O adapter 142, a communications adapter 144, the communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that functions ascribed to the checksum caching tool 102, typically are performed by the central processing unit that is embodied in FIG. 1 as the processor 104 executing such software instructions.

The processor 104 typically controls other software programs such as the compilation system 108, and those included in the O.S. 111 including the checksum caching tool 102. Henceforth, the fact of such cooperation among the processor 104 and the checksum caching tool 102, whether implemented in software, hardware, firmware, or any combination thereof, may therefore not be repeated or further described, but will be implied. The O.S. 111 may include a file system 116 that manages the storage and access of files within the computer system 100. Files typically include instructions and data. The interaction between the file system 116 and the O.S. 111 will be appreciated by those skilled in the art.

It will also be understood by those skilled in the relevant art that the functions ascribed to the checksum caching tool 102 and its functional files, whether implemented in software, hardware, firmware, or any combination thereof, may in some embodiments be included in the functions of the O.S. 111. That is, the O.S. 111 may include the checksum caching tool 102. In such embodiments, the functions ascribed to the checksum caching tool 102 typically are performed by the processor 104 executing such software instructions in the O.S. 111 that incorporate the checksum caching tool 102. Therefore, in such embodiments, cooperation by the checksum caching tool 102 with aspects of the O.S. 111 will not be stated, but will be understood to be implied.

Computer memory 106 may be any of a variety of known memory storage devices or future memory devices, including any commonly available random access memory (RAM), cache memory, magnetic medium such as a resident hard disk, or other memory storage devices. In one embodiment the O.S. 111 and the checksum caching tool 102 may reside in the memory 106 during execution in the computer system 100.

The compilation system 108 and the O.S. 111, may reside in the memory 106 when the checksum caching tool 102 is operating. Further, the compilation system 108 may operate in cooperation with the O.S. 111 to execute the checksum caching tool 102. That is, the present embodiment may employ the compilation system 108 to resolve any system-specific information such as address locations that are necessary to execute the checksum caching tool 102 in the computer system 100.

It will be appreciated that "execute" refers to the process of manipulating software or firmware instructions for operation on the computer system 100. The term "code" refers to instructions or data used by the computer system 100 for the purpose of generating instructions or data that execute in the computer system 100. Also, the term "function" may refer to a software "procedure" such as a unit of software that may be independently compiled.

The checksum caching tool 102 may be implemented in the "C" programming language, although it will be understood by those skilled in the relevant art that other programming languages could be used. Also, the checksum caching tool 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example the keyboard 148, the mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154.

Input/output devices could also include any of a variety of known data storage devices 140 including a compact disk drive, a tape drive, a removable hard disk drive, or a diskette drive.

By way of illustration, code may typically be loaded through an input device and may be stored on the data storage device 140. A copy of the code may alternatively be placed by the processor 104 into the memory 106 for faster execution on the computer system 100.

The computer system 100 may communicate with the network 146 through a communications adapter 144, such as a networking card. The network 146 may be a local area network, a wide area network, or another known computer network or future computer network. It will be appreciated that the I/O device used by the checksum caching tool 102 may be connected to the network 146 through the communications adapter 146 and therefore may not be co-located with the computer system 100. It will be further appreciated that other portions of the computer system, such as the data storage device 140 and the monitor 156, may be connected to the network 146 through the communications adapter 144 and may not be co-located.

FIG. 2 illustrates data structures and functions used by the checksum caching tool 102 and that may be stored in the memory 106. The memory 106 may include the following:

- a TCP/IP packet header 202, which includes meta-data that may be used to manage the operations related to the TCP/IP packet 204;
- a TCP/IP packet 204 that may be transmitted via the TCP/IP protocol;
- a file system buffer 206 that is a portion of the memory 106 allocated for the file system 116 (as shown in FIG. 1) data;
- a chunk 203, which is a unit of data that is used by the checksum caching tool 102 to determine the checksum 336;
- a chunk procedure 205 that manages the operation of the chunks 203;
- a validity bit 208, which is a flag that is associated with a checksum 336 and represents whether portions of the checksum 336 are currently valid with respect to the associated transmission data;
- a file system buffer header 210, which includes meta-data that may be used to manage the operations related to the file system buffer 206;
- a validity procedure 209 that manages the determination of validity of the checksum 336 or the partial_checksum 212;
- a TCP packet 310 that includes a TCP packet header 312 and a data block 314;
- a TCP packet header 312, which includes meta-data that may be used to manage the TCP packet 310;
- a checksum 336 that is a value related to the data to be transmitted, and the receiving computer may verify that the data in the transmitted packet has not changed between transmission and receipt by re-calculation of the checksum 336;
- a data block 314 that is transmitted information;
- a partial_checksum variable 212, which is a checksum for a portion of the data to be transmitted and may be combined with other parial_checksums 212 to create the checksum 336;
- a combined_checksum variable 213, which is a variable that stores intermediate values of the checksum 336 during the operation of the checksum caching tool 102;
- a this_sum variable 214, which is a variable that holds the partial_checksum 212 for the chunk 203 currently being processed;
- a message buffer header 504 that includes meta-data that is associated with the data to be transmitted;
- a chain of message buffer headers 503 that is an associated grouping of message buffer headers 504;
- a start_address 216, which is the starting address that locates data for transmission;
- an end_address 218, which is the ending address that locates data for transmission;
- as well as other data structures and functions.

Figure 3A:
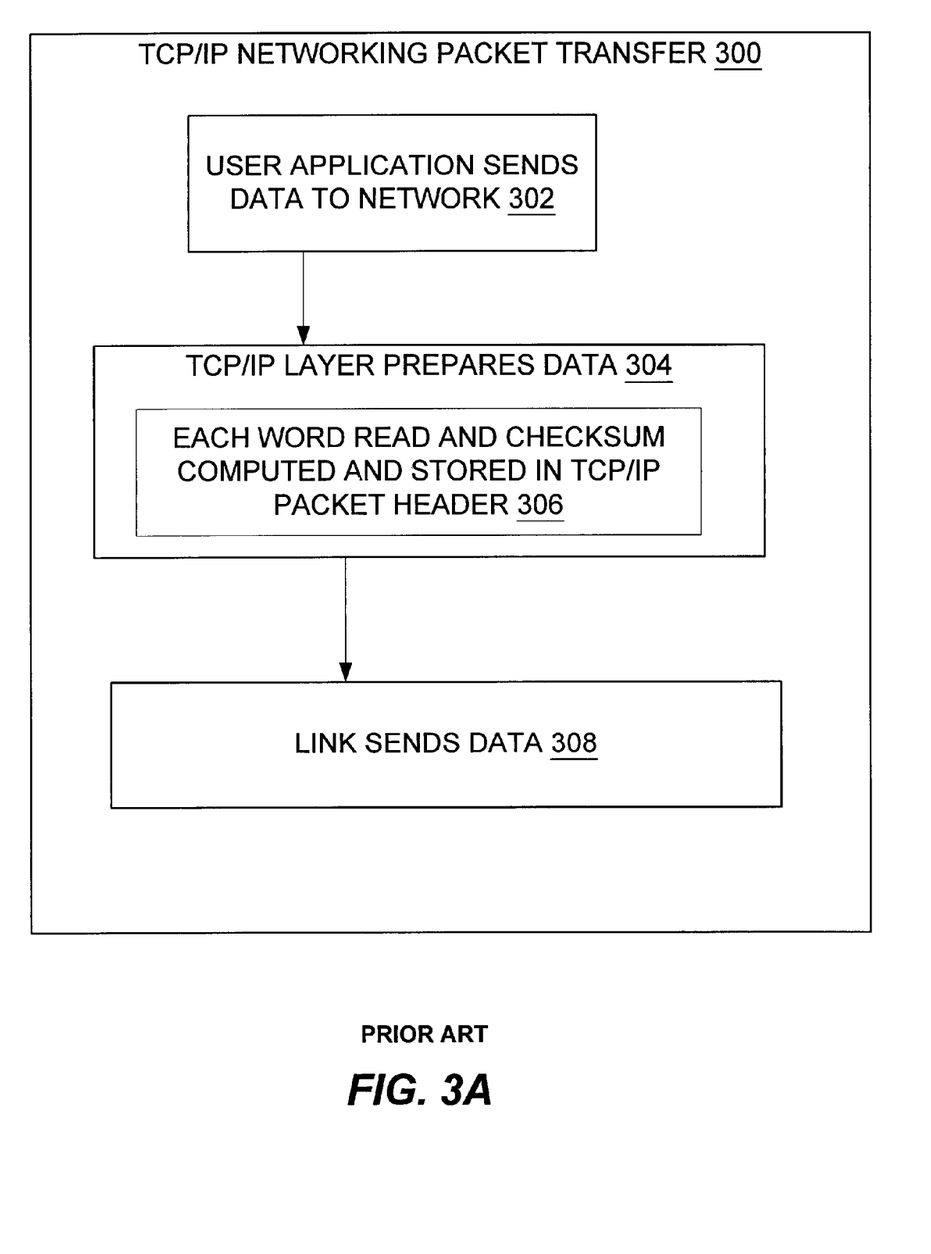
FIG. 3A is a block diagram that illustrates the TCP/IP networking packet transfer.

FIG. 3A is a block diagram that illustrates a TCP/IP networking packet transfer as shown in element 300. When an application initiates transmission of data to a network, as shown in element 302, the computer system 100 (as shown in FIG. 1) operates in compliance with the TCP/IP protocol to prepare the data as shown in element 304. For instance, each word in the data may be read and a checksum 336 (as shown in FIG. 2) created and stored in the TCP/IP packet header 202, as shown in element 306. It will be appreciated that a "word" of data may be a group of bits which are treated as one unit of instruction or data by a particular computer system 100.

After the TCP/IP packet 204 (as shown in FIG. 2) is prepared, the computer hardware transmits the data. More particularly and in the present embodiment, the link computer hardware sends the data as shown in element 308. Those skilled in the relevant art will appreciate the operation of transmitting data over a network by way of link hardware.

Figure 3B:
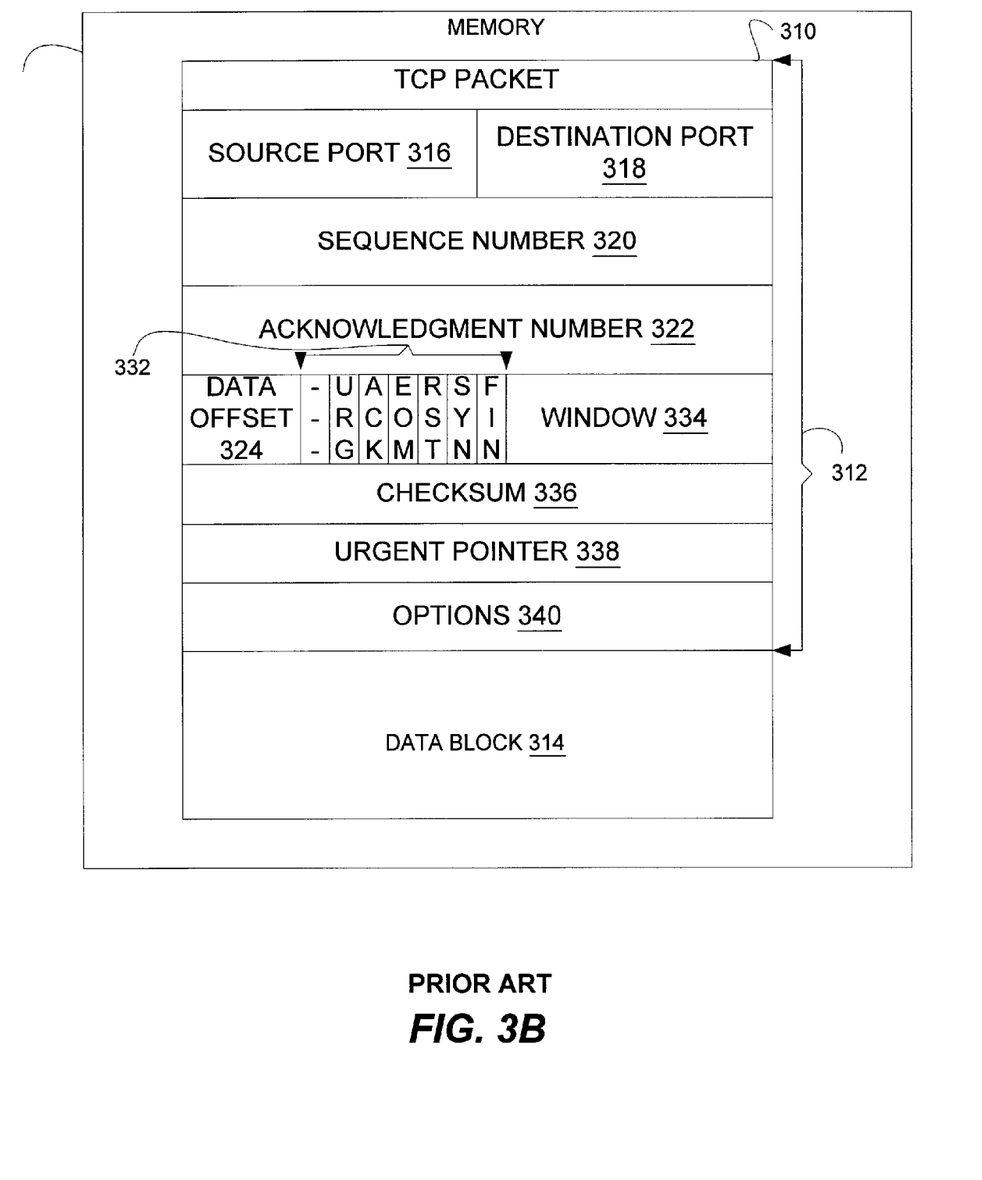
FIG. 3B is a block diagram that illustrates the memory that includes the TCP packet header.

FIG. 3B is a block diagram that illustrates the memory 106 that includes the TCP packet 310 that normally operates in the memory 106. The TCP packet 310 includes a TCP packet header 312 and a data block 314. The TCP packet 310 operates by following a protocol for packaging data for transmission over a computer communication network 146 (as shown in FIG. 1). It will be understood that the terms "segment" and "packet" may be used interchangeably herein and represent a specified unit of data that may be transmitted via the TCP/IP protocol.

Figure 4A:
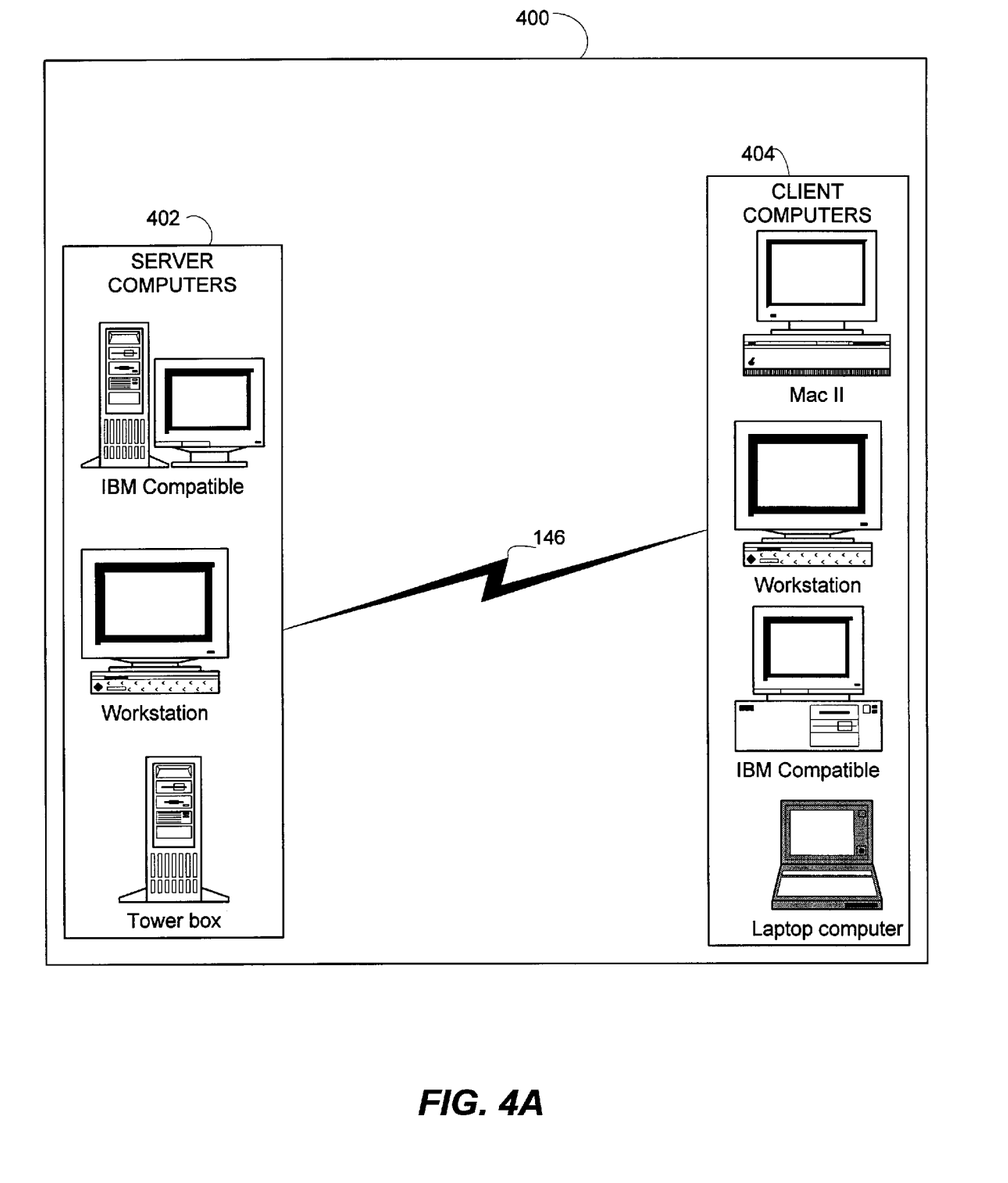
FIG. 4A is a block diagram that illustrates transmission over a network attached client and server.

The TCP packet header 312 includes the source port 316 and a source IP address (not shown) that together uniquely identify the source for the TCP connection. In the present embodiment a source computer system 100 (as shown in FIG. 1) may be the server computer 402 (as shown in FIG. 4A). Also, the TCP packet header 312 includes a destination port 318 that identifies the destination for the TCP connection when associated with a destination IP address (not shown). In the present embodiment a destination computer system 100 may be a client computer system 404 (as shown in FIG. 4A).

Further, the TCP packet header 312 includes a sequence number 320 and an acknowledgment number 322. The sequence number 320 indicates the next byte that will be transmitted by the source computer system 100 over the TCP protocol. The acknowledgment number 322 indicates the next byte that is expected from the destination computer system 100.

The data offset 324 and control bits 326 are included in the TCP packet header 312. The data offset 324 is the length of the words in the TCP packet header 312 and therefore may be used to determine where the data block 314 begins and the TCP packet header 312 ends. The control bits 322 include flags that store information such as whether the TCP packet 310 is urgent or whether there is no more data coming from the sender. Further the TCP packet header 312 includes a window 334 that indicates the number of words the receiving computer is able to receive.

The TCP packet header 312 includes an urgent pointer 338 and an options variable 340. The urgent pointer 338 is the location of the urgent data and is accessed when the urgent control bit is activated. The options variable 340 may provide information that is related to particular execution requirements for the TCP packet 310. The data block 314 is associated with the TCP packet header 312 and is the information to be transmitted.

It will be appreciated that the present embodiment operates primarily on the TCP protocol but may operate equally successfully on the IP protocol or any other communications protocol that functions with a checksum 336. Therefore, the TCP protocol will be used to illustrate the present embodiment.

It will be appreciated that the present embodiment is implemented for file system 116 (as shown in FIG. 1) data. However, it will be understood that the checksum caching tool 102 may be used for other types of data that may be transported over a network protocol using a checksum 336.

FIG. 4A is a block diagram illustrating networked attached server computers 402 and client computers 404. It will be appreciated that while specific types of computers have been used for illustration purposes in the present embodiment, the invention is not limited to these specific examples of computer systems 100 (as shown in FIG. 1). Therefore when the server computers 402 such as personal computers or workstations are connected to a network 146, and client computers 404 such as laptop computers, personal computers, or workstations are also connected to the network 146, data from the server computers 402 may be transmitted to the client computers 404.

More particularly and by means of illustration, when a web-based computer such as a client computer 404 is used with a web browser tool, file system 116 (as shown in FIG. 1) data may be accessed from a web page. It will be appreciated that the web browser tool may be any typical tool such as that marketed under the trademark MICROSOFT INTERNET EXPLORER®. Those skilled in the relevant art will appreciate the operation of a web page and a browser tool. The checksum caching tool 102 may advantageously determine whether web-based data is unaltered and therefore the associated checksum 336 (as shown in FIG. 2) may be re-used.

The server computer 402 may therefore be accessed via the web browser tool for the purpose of obtaining information from a web page. The file system 116 data associated with the web page on the server computer 402 may be managed by the O.S. 111. For instance, the file associated with the web page may be stored in the memory 106 for quick access in a portion of the memory 106 allocated for the file system I 16 such as the file system buffer 206. More particularly, the checksum caching tool 102 enables re-use of information related to the checksum 336 associated with network transmitted data, such as a web page, when the network transmitted data has not been altered since the last determination of the checksum 336.

Figure 4B:
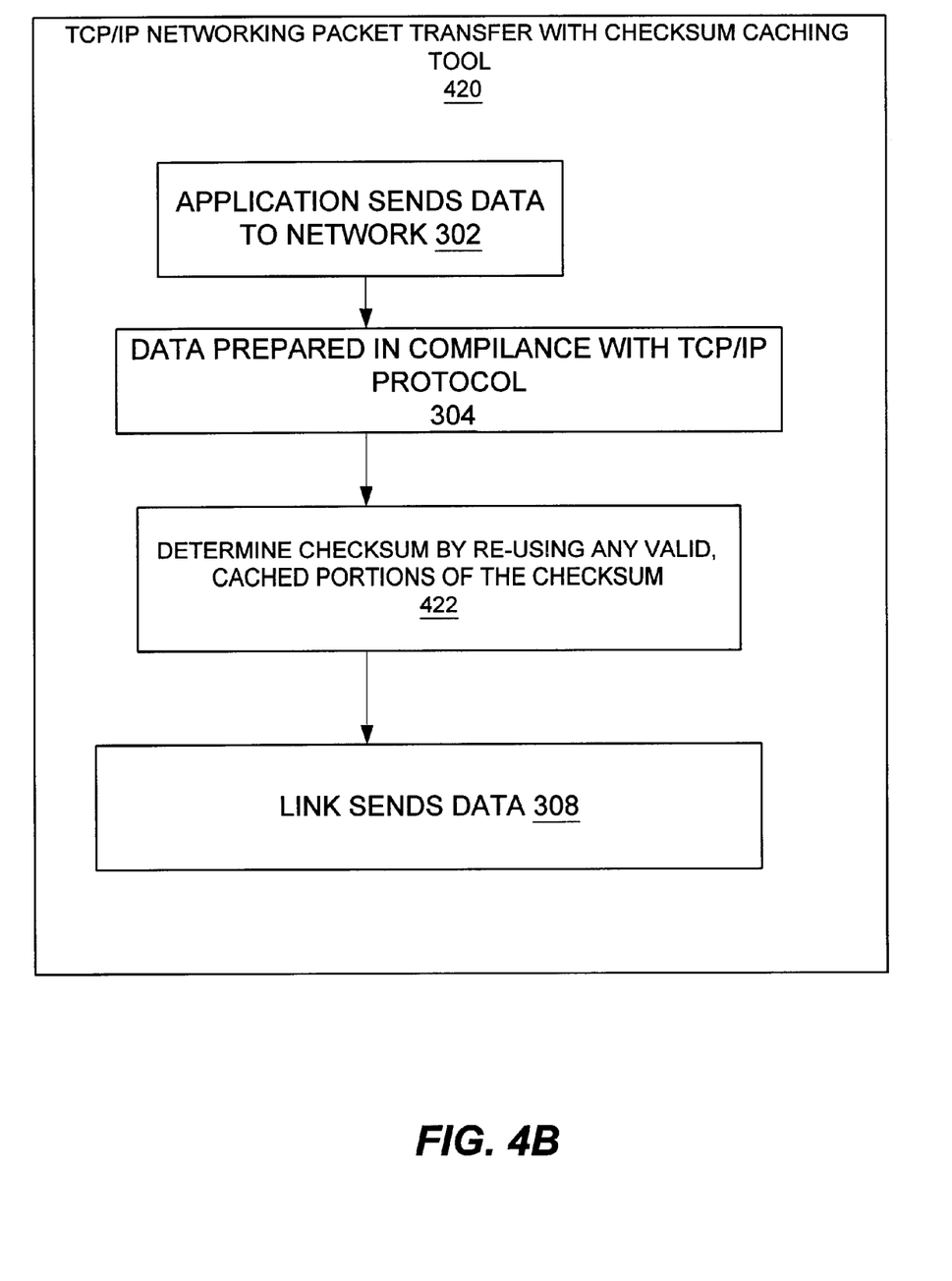
FIG. 4B is a high level block diagram that illustrates the TCP/IP networking packet transmission with the operation of the checksum caching tool.

FIG. 4B is a high level block diagram that illustrates a TCP/IP networking packet transfer with the operation of the checksum caching tool 102 as shown in element 420. When an application initiates transmission of data over a network, as shown in element 302, the computer system 100 (as shown in FIG. 1) operates in compliance with the TCP/IP protocol to prepare the data as shown in element 304. Further, the present embodiment may determine whether the TCP/IP packet 204 is unaltered and therefore whether the checksum 336 (as are shown in FIG. 2) is valid. The present embodiment may include a validity procedure 209 (as shown in FIG. 2) that manages the determination of validity of the checksum 336.

As shown in element 422, the checksum caching tool 102 determines the checksum 336 by re-using any valid, cached portions of the checksum 336. More particularly, the checksum caching tool 102 determines which chunks 203 (as shown in FIG. 2) of a TCP/IP networking packet 204 are unaltered by identifying whether the associated partial_checksums 212 (as shown in FIG. 2) remain valid. For instance, when a "write" instruction has been executed to a chunk 203 thereby altering the chunk 203, the partial_checksum 212 that was created before the write instruction was executed will no longer be valid. If the chunk 203 is valid, the associated partial_checksum 212 is re-used during transmission of the data over the network.

After the TCP/IP packet 204 is prepared, the computer hardware transmits the data. More particularly and in the present embodiment the link computer hardware sends the data as shown in element 308.

Figure 5:
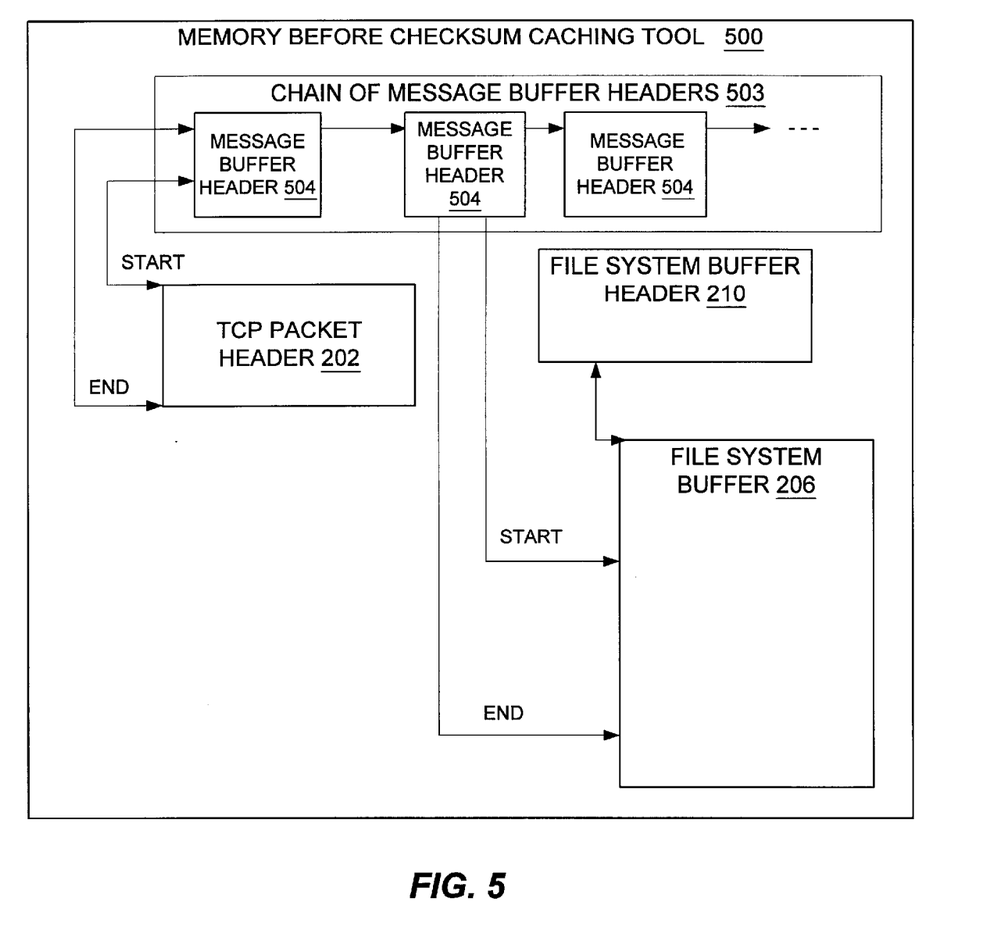
FIG. 5 is a block diagram that illustrates a typical embodiment of the memory before the operation of the checksum caching tool.

FIG. 5 is a block diagram, and as shown in element 500 illustrates the memory 106 before the operation of the checksum caching tool 102 (as shown in FIG. 1). The TCP packet header 312 may be accessed directly or as is typical, by a message buffer header 504 that is associated with the data to be transmitted. Therefore the message buffer header 504 may identify the starting and ending locations of the TCP packet header 312. Further, the message buffer header 504 may actually be a chain of message buffer headers 503. Therefore the message buffer header 504 may also include data that identifies the starting and ending addresses of data in the file system buffer 206 that will be transmitted. It will be appreciated that the message buffer header 504 may typically be managed by TCP protocol code.

Data from the file system 116 (as shown in FIG. 1) may be stored in the file system buffer 206 that may be located in portions of the memory 106. Each file system buffer 206 may have an associated file system buffer header 210 that includes meta-data that may be used to operate the file system buffer 206. It will be appreciated by those skilled in the art that the file system buffer 206 may be used to store recently accessed file system 116 data.

Figure 6A:
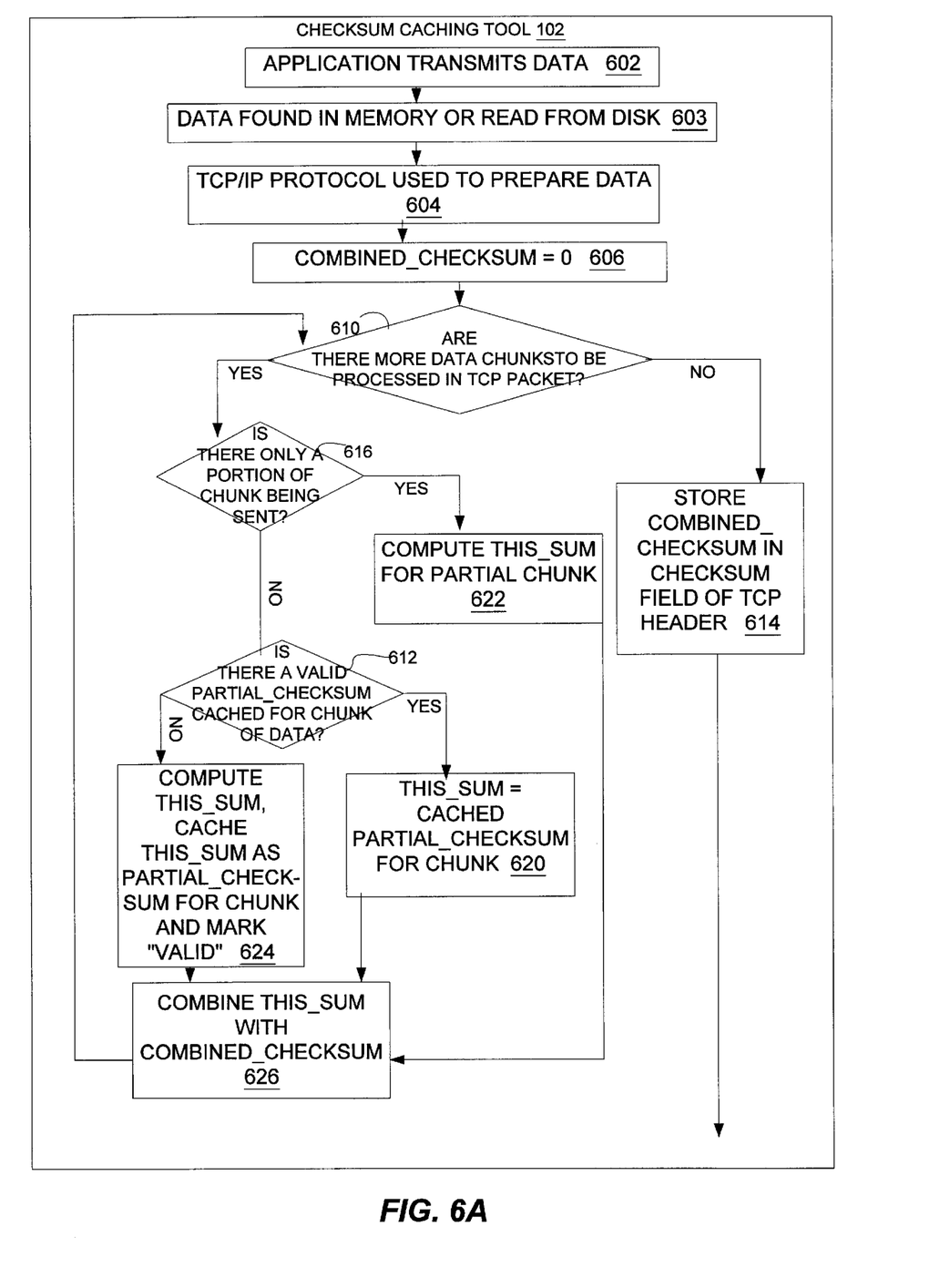
FIG. 6A is a high level flow diagram that illustrates the operation of the checksum caching tool.

FIG. 6A is a block diagram that illustrates the present embodiment of the checksum caching tool 102. This embodiment improves the efficiency of the outbound data management of the checksum 336 associated with a TCP/IP packet 204 (as are shown in FIG. 2). Without the operation of the checksum caching tool 102, the calculation of each checksum 336 is performed each time the data is packaged for transport via the TCP/IP protocol and the checksum 336 is stored anew in the TCP packet header 312 (as shown in FIGS. 2 and 3B).

The present embodiment advantageously eliminates much of the repetitive operations related to the checksum 336 when data that is already in the memory 106 (as shown in FIG. 1) and is not altered, is used in packaging a TCP/IP packet 204. Novelly, upon the first transmission of file system 116 (as shown in FIG. 1) data, an associated checksum 336 is determined and cached in the file system buffer header 210 (as shown in FIG. 2) that corresponds to the data in the TCP packet 310 that will be transmitted.

The checksum caching tool 102 partitions the file system buffer 206 (as shown in FIG. 2) into chunks 203 for the purpose of caching the checksum 336. More particularly, the present embodiment caches a partial_checksum 212 for each chunk 203. "Chunk" refers herein to the unit of data that is used to determine the partial_checksum 212 and the present embodiment caches a chunk of 256 bytes. The partial_checksums 212 associated with each chunk 203 in the data block 314 are aggregated and store in the TCP packet header 312 as the checksum 336. Further, the chunk procedure 205 (as shown in FIG. 2) manages the operation of the chunks 203.

It will be appreciated that caching the checksum 336 at the granularity of a chunk 203 rather than for the entire file system buffer 206 advantageously operates on an amount of data that may be transmitted via the TCP/IP protocol, since the size of a chunk 203 may be defined to be less than or equal to the minimum segment size defined by the TCP protocol. That is, the size of the file system buffer 206 may exceed the largest size of a packet that can be transmitted by the link. If one checksum 336 was cached for all the data in the file system buffer 206 the possibility of re-use of the cached checksum 336 would be minimized since the data in the file system buffer 206 would exceed the largest size of a packet that can be transmitted by the link. Therefore, the present embodiment advantageously associates the partial_checksum 212 with a chunk 203 thereby increasing the possibility of re-using the partial_checksum 212.

More particularly, the present embodiment advantageously creates meta-data that includes a validity bit 208 for each partial_checksum 212 associated with each chunk 203, and stores this meta-data in the file system buffer 206. Therefore the validity bit 208 associated with a partial_checksum 212 is marked "valid" when the partial_checksum 212 is determined to accurately represent the associated chunk 203. When the chunk 203 is accessed again, if it has not been altered, it will be found to have a "valid" validity bit 208 and the associated partial_checksum 212 will be used without re-computation. Further, the present embodiment includes a validity procedure 209 (as shown in FIG. 2) that manages the determination of validity of the checksum 336 or the partial_checksum 212.

Returning to FIG. 6A, when an application transmits data, as shown in element 602, the operation of the checksum caching tool 102 is initiated. Data for transmission is found either on a disk or in the memory 106, as shown in element 603. Typically, the data is prepared for transmission by use of the TCP or IP protocols as shown in element 604, and the checksum caching tool 102 initializes the "combined_checksum" 213 variable to zero as shown in element 606. The combined_checksum 213 is a variable that is used to store intermediate values of the checksum 336 during the operation of the checksum caching tool 102. Upon completion of the operation of the checksum caching tool 102 the combined_checksum 213 is stored in the checksum 336 field as shown in element 614. It will be understood that the checksum 336 field is an element of the TCP packet header 312 (as shown in FIGS. 2 and 3B).

The checksum caching tool 102 operates on each data chunk 203 in the TCP/IP packet 204. The initial test is whether there is more data to be processed in the chunks 203 transmitted in the TCP packet 310 as shown in element 610. If there is no more data to be processed, then the checksum caching tool 102 stores the combined_checksum 213 in the checksum 336 of the TCP packet header 312 associated with the file system 116 data to be transmitted as shown in element 614. Recall that for purposes of illustration file system 116 data has been used in the present embodiment but the checksum caching tool 102 is not in any way limited to file system 116 data in its operation.

Alternately, if there is more data to be processed as tested in element 610, the checksum caching tool 102 then tests whether the data to be processed is a full chunk 203 or whether the data occupies only a portion of the chunk 203, as shown in element 616. If the data uses only a portion of the chunk 203, then the checksum caching tool 102 computes the checksum 336 for the portion and stores the checksum 336 in the "this_sum" 214 variable as shown in element 622. This_sum 214 is the variable that holds the partial_checksum 212 for the chunk 203 currently being processed. Finally, this_sum 214 is combined with the combined_checksum 213 as shown in element 626 and the test as shown in element 610 is repeated.

If the data to be transmitted is an entire chunk 203 as tested in element 616, then the checksum caching tool 102 tests whether the checksum 336 is valid for the chunk 203 of data as shown in element 612. If the checksum 336 is not valid, then the checksum caching tool 102 determines this_sum 214 that is the partial_checksum 212 for the current chunk 203 of data, caches this_sum 214 as the partial_checksum 212 for the chunk 203, and marks the chunk 203 as "valid," as shown in element 624. It will be appreciated that the calculation of the partial_checksum 212 may be completed in accordance with the definition in Section 3.1 of the, "Transmission Control Protocol DARPA Internet Program Protocol Specification 793," September, 1981. Further, this_sum 214 is combined with the combined checksum 213 as shown in element 626 and the test as shown in element 610 is repeated.

If the partial_checksum 212 is valid as tested in element 612, then the checksum caching tool 102 advantageously assigns the cached partial_checksum 212 associated with the chunk 203 to this_sum 214, as shown in element 620. Further, this_sum 214 is combined with the combined_checksum 213 as shown in element 626 and the test as shown in element 610 is repeated.

Figure 6B:
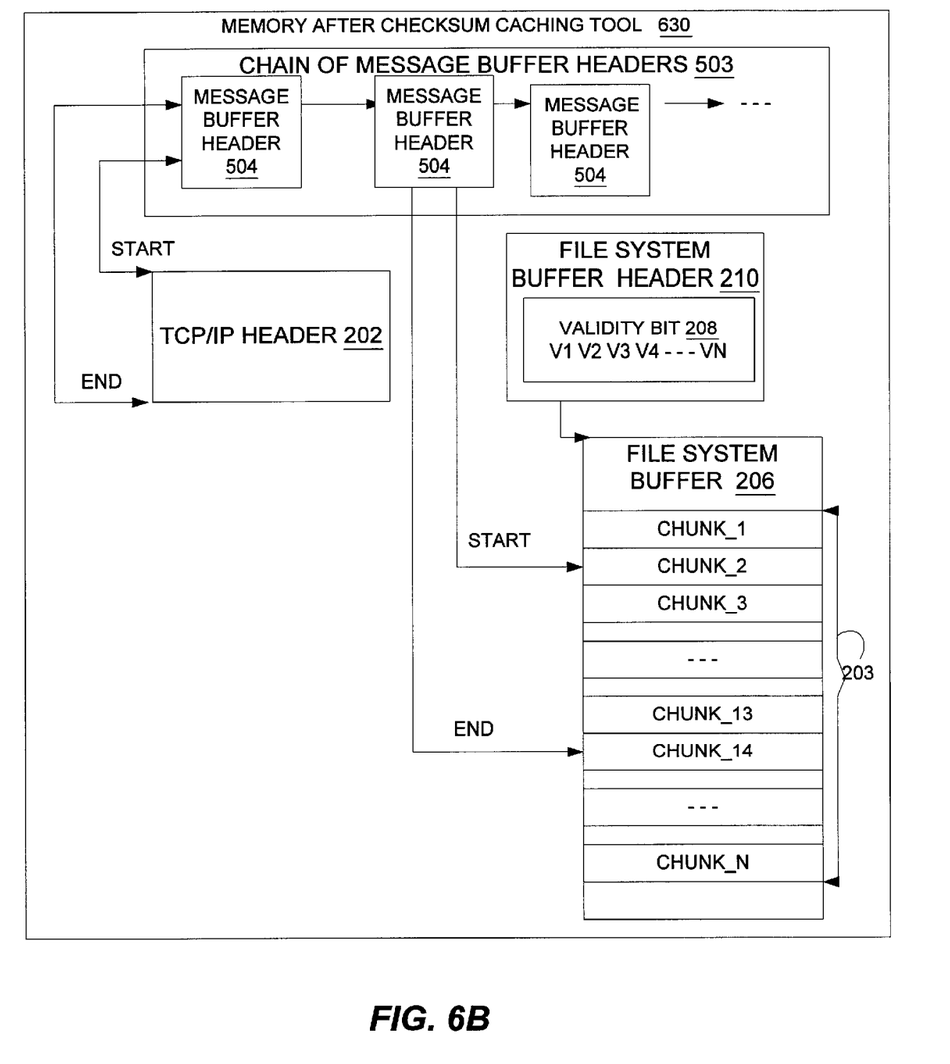
FIG. 6B is a block diagram that illustrates a typical embodiment of the memory after the operation of the checksum caching tool.

FIG. 6B is a block diagram, and as shown in element 630 illustrates the memory 106 after the operation of the checksum caching tool 102 (as shown in FIG. 1). The TCP/IP packet header 202 may be accessed directly or as is typical, by a message buffer header 504 that may identify the starting and ending location of the TCP/IP packet header 202. Further, the message buffer header 504 may actually be a chain of message buffers 503 and the message buffer header 504 may also include data that identifies the starting address and ending address of data in the file system buffer 206 that will be transmitted.

It will be appreciated that data is valid when it has not changed since the last determination of the checksum 336 (as shown in FIG. 2). Therefore a checksum 336 will be identified as invalid when a file system buffer 206 is re-used or when the file system buffer 206 is altered. The present embodiment may employ a mapping structure, the validity bit 208, that stores the validity status of each partial_checksum 212 (as shown in FIG. 2) associated with a chunk 203 of the file system 116 data. That is a validity flag, or in the present embodiment a validity bit 208, may be set depending on whether the partial_checksum 212 associated with a chunk 203 is presently valid or must be determined.

It will be appreciated that the starting address and ending address of file system 116 data may not coincide with a boundary for a chunk 203 of the memory 106. Therefore, there is a special case of the present embodiment that handles a chunk 203 when only a portion of the chunk 203 is being transmitted. The partial_checksum 212 for the portion of the chunk 203 will be determined anew since only a portion of the chunk 203 is being transmitted, and the portion of the checksum 336 related to the chunk 203 represents the entire chunk 203. Therefore, if the beginning and ending portion of the file system 116 data are partially used chunks 203 such as is illustrated in the present embodiment by Chunk_2 and Chunk_14 in FIG. 6B, the partial_checksum 212 will be re-calculated for the partially filled chunks 203.

ALTERNATIVE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the checksum caching tool are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A method for re-using a checksum in a computer system coupled to a network, said method comprising:

managing data in said computer system for transmission over said network;

associating said data with a checksum derived for a first instance of data transmission over said network;

identifying whether said checksum is valid for a second instance of data transmission by determining whether said data is unaltered since said first instance of data transmission; and re-using said checksum during said second instance of data transmission over said network when said checksum is valid.

2. The method as set forth in claim 1 further comprising, wherein associating said data with said checksum further includes caching said checksum in said computer system.

3. A method for re-using checksums in a computer system coupled to a network, said method comprising:

managing data in said computer system for transmission over said network, said data comprising data packets;

partitioning a data packet into chunks;

wherein for each of said chunks, associating a chunk with a partial checksum derived for a first instance of data transmission over said network, identifying whether said partial checksum is valid for a second instance of data transmission by determining whether said chunk is unaltered since said first instance of data transmission, and re-using said partial checksum for said second instance of data transmission when said partial checksum is valid; and combining each valid partial checksum into said checksum.

4. The method as set forth in claim 3 further comprising, transmitting said data with said checksum over said network.

5. The method as set forth in claim 3 further comprising, wherein associating said chunk with said partial checksum further includes caching said partial checksum in said computer system.

6. The method as set forth in claim 3 further comprising, wherein when said partial checksum is invalid for said second instance of data transmission;

determining a valid partial checksum for said chunk; and combining said valid partial checksum with said checksum.

7. The method as set forth in claim 3 further comprising;

determining when a chunk includes partially used data;

determining a valid partial checksum for a chunk having partially used data; and combining said valid partial checksum for said chunk having partially used data, with said checksum.

8. A checksum caching apparatus for re-using a checksum in a computer system coupled to a network and having a procedure and data; said checksum caching apparatus comprising:

said data being associated with a checksum derived for a first instance of data transmission over said network; and a validity procedure executing in said computer system and identifying whether said checksum is valid for a second instance of data transmission by determining whether said data is unaltered since said first instance of data transmission, and re-using said checksum during said second instance of data transmission over said network when said checksum is valid.

9. The checksum caching apparatus as set forth in claim 8, further comprising associating said data with said checksum by caching said checksum in said computer system.

10. A checksum caching apparatus for re-using checksums in a computer system coupled to a network and having a procedure and data, said data comprising data packets; said checksum caching apparatus comprising:

said data packets partitioned into chunks; and a chunk procedure executing in said computer system, wherein for each of said chunks, said chunk procedure associating a chunk with a partial checksum derived for a first instance of data transmission over said network, identifying whether said partial checksum is valid for a second instance of data transmission by determining whether said chunk is unaltered since said first instance of data transmission, and combining each valid partial checksum into said checksum.

11. The checksum caching apparatus as set forth in claim 10, further comprising transmitting said data with said checksum over said network.

12. The checksum caching apparatus, as set forth in claim 10, further comprising associating said data with said partial checksum by caching said partial checksum in said computer system.

13. A checksum caching apparatus as set forth in claim 10, said chunk procedure further comprising; wherein when said partial checksum is invalid for said second instance of data transmission, determining a valid partial checksum for said chunk, and combining said valid partial checksum with said checksum.

14. A checksum caching apparatus as set forth in claim 10 further comprising, said chunk procedure determining a valid partial checksum for a chunk including partially used data; and said chunk procedure combining said valid partial checksum for said chunk including said partially used data with said checksum.

15. A computer readable memory device encoded with a data structure having entries, for re-using a checksum entry in a computer system coupled to a network and having a procedure entry and a data entry; said memory device comprising:

said data entry being associated with a checksum entry derived for a first instance of data entry transmission over said network; and a validity procedure entry executing in said computer system and identifying whether said checksum entry is valid for a second instance of data entry transmission by determining whether said data entry is unaltered since said first instance of data entry transmission, and reusing said checksum entry during said second instance of data entry transmission over said network when said checksum entry is valid.

16. The computer readable memory device as set forth in claim 15, further comprising wherein said validity procedure entry associates said data entry with said checksum entry by caching said checksum entry in said computer system.

17. A computer readable memory device encoded with a data structure having entries, for re-using a checksum entry in a computer system coupled to a network and having a procedure entry and a data entry, said data entry comprising data packets, said memory device comprising:

said data packets partitioned into chunk entries; and a chunk procedure entry executing in said computer system, wherein for each of said chunk entries, said chunk procedure entry associating a chunk entry with a partial checksum entry derived for a first instance of data entry transmission over said network, identifying whether said partial checksum entry is valid for a second instance of data entry transmission by determining whether said chunk entry is unaltered since said first instance of data entry transmission, and combining each valid partial checksum entry into said checksum entry.

18. The computer readable memory device as set forth in claim 17, further comprising transmitting said data entry with said checksum entry over said network.

19. The computer readable memory device as set forth in claim 17 further comprising, wherein said chunk procedure entry associates said data entry with said partial checksum entry by caching said partial checksum entry in said computer system.

20. An article of manufacture comprising a program storage medium having computer readable program code embodied therein, for re-using a checksum in a computer system coupled to a network, said article of manufacture comprising:

computer readable program code for managing data in said computer system for transmission over said network;

computer readable program code for associating said data with a checksum derived for a first instance of data transmission over said network;

computer readable program code for identifying whether said checksum is valid for a second instance of data transmission by determining whether said data is unaltered since said first instance of data transmission; and computer readable program code for re-using said checksum during said second instance of data transmission over said network when said checksum is valid.

21. The article of manufacture as set forth in claim 20 further comprising, computer readable program code wherein associating said data with said checksum further includes caching said checksum in said computer system.

22. An article of manufacture comprising a program storage medium having computer readable program code embodied therein for re-using a checksum in a computer system coupled to a network, said article of manufacture comprising:

computer readable program code for managing data in said computer system for transmission over said network, said data comprising data packets;

computer readable program code for partitioning a data packet into chunks;

wherein for each of said chunks, computer readable program code for associating a chunk with a partial checksum derived for a first instance of data transmission over said network, identifying whether said partial checksum is valid for a second instance of data transmission by determining whether said chunk is unaltered since said first instance of data transmission, and re-using said partial checksum for said second instance of data transmission when said partial checksum is valid; and computer readable program code for combining each valid partial checksum into said checksum.

23. The article of manufacture as set forth in claim 22, further comprising computer readable program code for transmitting said data with said checksum over said network.

24. The article of manufacture as set forth in claim 22 further comprising, computer readable program code for associating said chunk with said partial checksum that further includes caching said partial checksum in said computer system.

\* \* \* \* \*